US012434241B2

(12) United States Patent
Eslami Amirabadi et al.

(10) Patent No.: US 12,434,241 B2
(45) Date of Patent: Oct. 7, 2025

(54) MICROFLUIDIC DEVICE FOR ANALYZING A MEMBRANE

(71) Applicant: Nederlandse Organisatie voor toegepast-natuurwetenschappelijk onderzoek TNO, 's-Gravenhage (NL)

(72) Inventors: Hossein Eslami Amirabadi, Utrecht (NL); Evita Van De Steeg, Elspeet (NL); Lida Joanne Stevens, Leiden (NL); Tim Leonardus Petrus Donkers, Eindhoven (NL); Bastiaan Leonardus Joseph Ingenhut, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 462 days.

(21) Appl. No.: 17/794,240

(22) PCT Filed: Jan. 22, 2021

(86) PCT No.: PCT/NL2021/050040
§ 371 (c)(1),
(2) Date: Jul. 20, 2022

(87) PCT Pub. No.: WO2021/150113
PCT Pub. Date: Jul. 29, 2021

(65) Prior Publication Data

US 2023/0076661 A1 Mar. 9, 2023

(30) Foreign Application Priority Data

Jan. 24, 2020 (EP) .................................... 20153565

(51) Int. Cl.
*B01L 3/00* (2006.01)

(52) U.S. Cl.
CPC . *B01L 3/502753* (2013.01); *B01L 2200/0621* (2013.01); *B01L 2300/0681* (2013.01);
(Continued)

(58) Field of Classification Search
CPC ....... B01L 3/502753; B01L 2200/0621; B01L 2300/0681; B01L 2300/0874;
(Continued)

(56) References Cited

U.S. PATENT DOCUMENTS

| | | | |
|---|---|---|---|
| 2002/0172621 A1 | 11/2002 | Barbera-Guillem | |
| 2005/0160801 A1 | 7/2005 | Brumboiu et al. | |

(Continued)

FOREIGN PATENT DOCUMENTS

| | | | |
|---|---|---|---|
| CN | 101312786 A | 11/2008 | |
| CN | 105555406 A | 5/2016 | |

(Continued)

OTHER PUBLICATIONS

European Patent Office, International Search Report in corresponding International Application No. PCT/NL2021/050040, dated Mar. 17, 2021 (3 pages).

(Continued)

*Primary Examiner* — Jennifer Wecker
*Assistant Examiner* — Britney N. Washington
(74) *Attorney, Agent, or Firm* — Leydig, Voit & Mayer, Ltd.

(57) ABSTRACT

A microfluidic device for analyzing permeability of substances through a membrane. Flow channels pass respective fluid flows with the substances through the housing between respective connectors. An access cavity extends from outside into the housing through the first flow channel and into the second flow channel for accessing an inside of the housing. The membrane can be placed over a cavity opening forming a fluid interconnection between overlapping areas
(Continued)

of the flow channels A clamping ring in the first flow channel holds the sample membrane in place over the cavity opening while the membrane is exposed to the respective fluid flows through the flow channels on either sides of the membrane.

16 Claims, 5 Drawing Sheets

(52) U.S. Cl.
CPC . *B01L 2300/0874* (2013.01); *B01L 2300/088* (2013.01); *B01L 2400/0487* (2013.01)

(58) Field of Classification Search
CPC ....... B01L 2300/088; B01L 2400/0487; B01L 2300/0618; B01L 2300/0864; B01L 2300/0867; B01L 3/502707; C12M 23/16; C12M 23/46; C12M 21/08; C12M 33/14
See application file for complete search history.

(56) References Cited

U.S. PATENT DOCUMENTS

| | | | | |
|---|---|---|---|---|
| 2014/0315303 | A1* | 10/2014 | Huang | B01L 3/502 435/366 |
| 2018/0326417 | A1* | 11/2018 | Wikswo | C12M 23/34 |
| 2019/0177678 | A1* | 6/2019 | Bigliardi | C12M 23/16 |
| 2021/0198607 | A1* | 7/2021 | Wikswo | F16K 99/0023 |

FOREIGN PATENT DOCUMENTS

| | | | |
|---|---|---|---|
| EP | 3498818 | A1 | 6/2019 |
| JP | 2000237553 | A | 9/2000 |
| JP | 2006516743 | A | 7/2006 |
| JP | 2008035777 | A | 2/2008 |
| JP | 2011528232 | A | 11/2011 |
| JP | 2014506801 | A | 3/2014 |
| JP | 2017501745 | A | 1/2017 |
| JP | 2018535688 | A | 12/2018 |
| WO | WO 2017/091718 | A1 | 6/2017 |
| WO | 2019163925 | A1 | 8/2019 |
| WO | WO 2019/231977 | A1 | 12/2019 |

OTHER PUBLICATIONS

China National Intellectual Property Administration, First Office Action in corresponding Chinese Application No. 202180014808.3 dated Mar. 28, 2025.

* cited by examiner

MICROFLUIDIC DEVICE FOR ANALYZING A MEMBRANE

CROSS-REFERENCE TO RELATED APPLICATIONS

This patent application is a U.S. National Phase of PCT International Application No. PCT/NL2021/050040, filed Jan. 22, 2021, which claims priority to European Application No. 20153565.5, filed Jan. 24, 2020, which are both expressly incorporated by reference in their entireties, including any references contained therein.

TECHNICAL FIELD AND BACKGROUND

The present disclosure relates to a microfluidic device, e.g. chip or flow cell, and method of analyzing permeability of a sample membrane, e.g. (epithelial) barrier, (fresh) tissue explant, cell layers, scaffold, or other membranes. For example, a piece of tissue explant may contain different cell types which can be distinguished from cell mono- or double layers, or a suspension of cells injected into a chip.

WO 2012/118799 A2 describes systems and methods for culturing and/or maintaining intestinal cells, tissues and/or organoids in vitro. The cells, tissues and/or organoids cultured can mimic or reproduce natural intestinal epithelial structures and behavior as well as support co-culture of intestinal microflora.

WO 2014/069995 A1 describes a vial for holding a segment of epithelial tissue. More specifically, to a vial which is easy to assemble and allows horizontal alignment of the tissue sample. The prior art further relates to a device comprising the vial, to methods for generating the device, and to a multitude of said devices which allow medium throughput measurements of absorption, transport and/or secretion across an epithelial tissue.

EP 2 233 924 A1 describes a biochip assembly comprising a semi-permeable membrane and an assay method using the biochip assembly for carrying out cell based assays. The ability to monitor migration of biological cells through tight layer of other cells and tissues can be important for understanding of mechanism of diseases and development of therapeutic drugs. In this prior art, there is provided a method for measuring the migration of sample cells in an assembly comprising a plurality of compartments in fluid communication wherein the method comprises introducing analyte into at least one analyte receiving compartment, introducing samples cells into at least one sample cell receiving compartment wherein the sample cells are separated from the analyte by a semipermeable membrane, and the analyte and/or the sample cells are subjected to controlled flow conditions. In this manner the assembly may comprise two compartments in the form of a channel divided into two by a semi-permeable membrane, or a channel and a well/chamber. Alternatively, the assembly may comprise a plurality of compartments in the form of two or more channels, and even two or more channels and well/chambers. The compartments are in fluid communication for at least part of the surface/length of the compartment. In this manner, the analyte receiving compartment is separated from the sample cell receiving compartment by a semi-permeable membrane.

One challenge in existing devices is to mimic the properties of human epithelial cells. For example, epithelial cells are cultured on a substrate to mimic the epithelial tissue in the gut. However, such cultured cells may not possess all intestinal epithelial subtypes and genetic variations of actual epithelial tissue. Another or further challenge may relate to mounting an epithelial tissue sample, e.g. wherein the sample does not sufficiently adhere to the sides of the membrane. For example, as it is difficult to attach the tissue sample to the sides by proliferation (cell growth), leakage may occur. Other or further challenges may relate to reliably mounting and dismounting of membranes between channels inside the device.

SUMMARY

Aspects of the present disclosure relate to a microfluidic device for analyzing permeability of substances through a (sample) membrane, e.g. to study different properties of epithelial barriers, such as their permeability to different biological and pharmacological substances. The microfluidic device comprises a housing with flow channels for passing a respective fluid flow, e.g. two parallel flows, between respective connectors. For example, the substances can be dissolved or suspended in at least one of the fluid flows. An access cavity can be used to access the housing to place the membrane, e.g. biological barrier, over a cavity opening. The cavity opening preferably forms an exclusive fluid interconnection between overlapping areas of the flow channels. A clamping ring, preferably forming part of a flow channel, can be used to hold the sample membrane in place over the cavity opening while the membrane is, in use, exposed to the respective fluid flows through the flow channels on either sides of the membrane. The microfluidic device can be used in a system including a pump and respective reservoirs connected to the channels. Use of the microfluidic device or system may include placing the membrane in the cavity opening between the first flow channel and the second flow channel and passing respective flows via the respective reservoir through the flow channels on either sides of the membrane.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
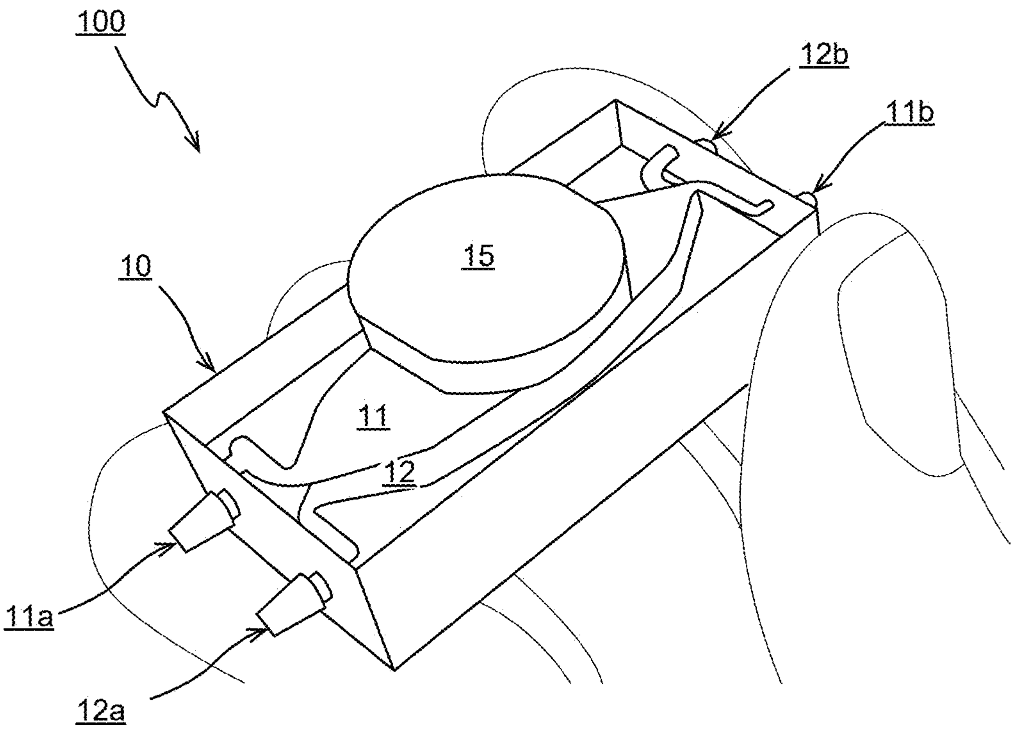
FIG. 1A illustrates a perspective view of a microfluidic device closed by a cap.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A illustrates a perspective view of a microfluidic device 100 closed by a cap 15. In one embodiment, e.g. as shown, the microfluidic device 100 has a housing forming at least two flow channels 11,12. Also three or more channels can be envisaged (not shown). In the embodiment shown, the microfluidic device 100 is translucent, so the channels 11,12 through the housing 10 are visible, as well as possible content of the channels. This may allow to easily view a flow inside the housing without opening the cap. Also other, e.g. opaque, materials can be used. Preferably, the housing 10 comprises, e.g. essentially consists of, a material such as plastic. In a preferred embodiment, e.g. as shown here, the device is manufactured by 3D printing. For example, the device is made of a printable (cured) material. Also other manufacturing methods and materials can be envisaged.

Figure 1B:
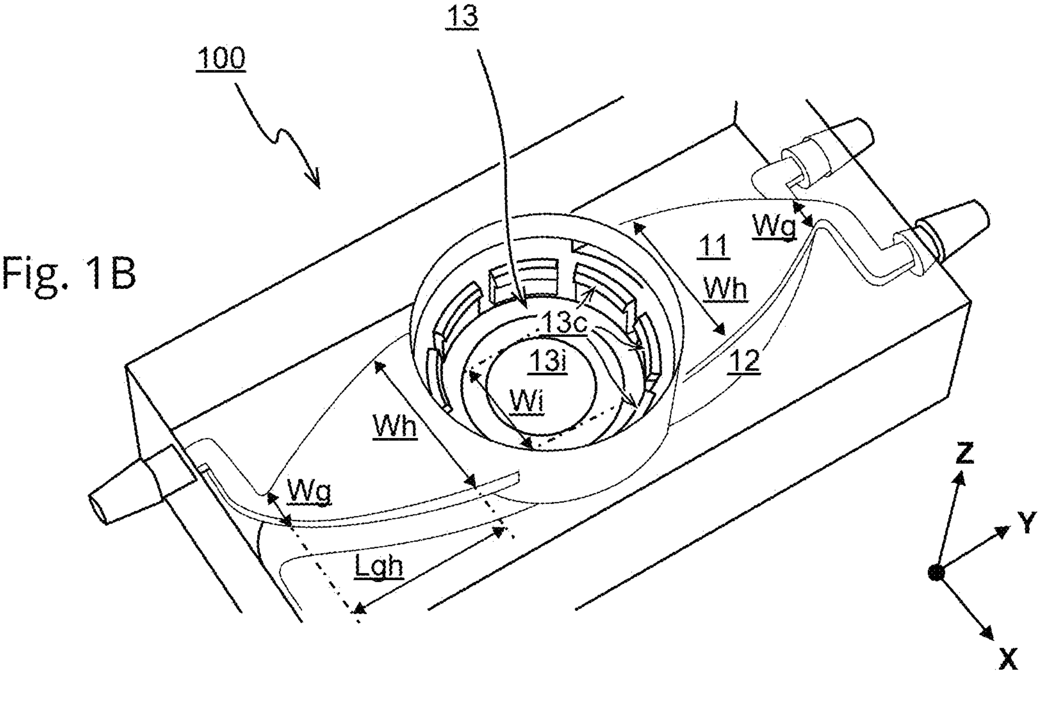
FIG. 1B illustrates another view of the microfluidic device without the cap to show a cavity extending into the housing and interconnecting the channels.

FIG. 1B illustrates another view of the microfluidic device 100 without the cap to show a cavity 13 extending into the housing 10 and interconnecting the channels 11,12. In some embodiments, the channels 11,12 extend between respective connectors 11*a*,11*b*; 12*a*,12*b*. Preferably, the connectors protrude from the housing to connect a (flexible) hose or flow tube (not shown here). For example, each connector comprises a short tube shape which extends from the housing. In some embodiments, the connector is tapered to more easily connect a flow tube. In other or further embodiments, the connector has a rim to prevent the flow tube slipping off. Alternatively, or in addition to protruding connectors, also inward extending (concave) connectors can be envisaged (not shown). For example, a flow tube, or connection part thereof, may be inserted into the connector of the device housing. The inward connectors may also be tapered and/or provided with a rim. Also other types of connections between the device 100 and respective flow tubes or other channels can be envisaged.

In some embodiments, e.g. as shown, the connectors 11*a*,12*a* on the same face of the housing may be offset in a lateral direction (X) from a central plane. This may provide more room to place the connectors and/or to connect the outside flow circuit, especially if the flow channels 11,12 run close together in the height direction (Z). In some embodiments, e.g. as shown, the flow channels 11,12 are symmetric before and after the access cavity 13. For example, a path of the channels may be rotation symmetric, as in the embodiment shown, and/or mirror symmetric.

In one aspect, the present disclosure provides a microfluidic device 100 for analyzing permeability of substances through a (sample) membrane M. For example, the substances are disposed in a respective fluid flow F1,F2. Typically, the microfluidic device 100 comprises a housing 10 with flow channels 11,12. In some embodiments, a first flow channel 11 is configured to pass a first fluid flow F1 through the housing 10 between a first input connector 11 and a first output connector 11*b*. In other or further embodiments, a second flow channel 12 is configured to pass a second fluid flow F2 through the housing 10 between a second input connector 12*a* and a second output connector 12*b*.

In a preferred embodiment, the device comprises an access cavity 13 extending from outside into the housing 10 through the first flow channel 11 and into the second flow channel 12. Accordingly, the cavity can be used for accessing an inside of the housing 10 to place the membrane M over a cavity opening 13*i*. Most preferably, the cavity opening 13*i* forms an (exclusive) fluid interconnection between overlapping areas of the flow channels 11,12.

In a preferred embodiment, the access cavity 13 can be opened and/or closed off by a cap 15. Most preferably, the cap 15 can be reversibly removed to access the cavity and, e.g., place or replace the membrane M. For example, the cap 15 and/or housing comprises a resilient material such as rubber there between the seal the cap to the housing. Also other resilient structures can be used, or the cap can be screwed to the housing.

In one embodiment, e.g. as shown, the flow channels 11,12 have a channel width Wh (in the lateral direction X transverse to the main flow direction Y) directly before and/or after the cavity opening 13*i* which channel width Wh is larger than a cross-section diameter Wi of the cavity opening 13*i* between the flow channels 11,12, e.g. larger by at least a factor 1.1, preferably at least a factor 1.2, or even more than a factor 1.3. For example, the cross-section diameter Wi of the cavity opening 13*i* in the shown embodiment is around 5.5 mm, while the channel width Wh directly before the cavity opening 13*i* is around 7 mm. The wider the flow channels 11,12 before and/or after the cavity opening 13*i*, the more even the flow across the membrane.

In another or further embodiment, the flow channels 11,12 start with a first channel width Wg at a side of the input and/or output connectors, and gradually widen to a second channel width Wh towards the cavity opening 13*i*, wherein the second channel width Wh is larger than the first channel width Wg by at least a factor two, three, or more. For example, the initial channel width Wh can be similar to the channel height (not indicated here), e.g. in the shown embodiment around 1 mm, while the channel width Wh directly before the cavity opening 13*i* can be around 7 mm. By gradually widening the width of the channel, a more predictable/even flow can be realized across the membrane. For example, the gradual widening can be quantified as the increase in width ($\Delta W$) per unit length ($\Delta L$) along a direction (Y) of the flow (through a center of the channel), wherein the ratio ($\Delta W/\Delta L$) is preferably less than one. For example, in the shown embodiment $(Wh-Wg)/Lgh \approx (7\text{ mm}-1\text{ mm})/10\text{ mm}=0.6$.

In some embodiments, a width Wh of the flow channels 11,12 (here in direction X), at least directly before the cavity opening 13*i* is much larger than a respective height of the flow channels 11,12 (here in direction Z), e.g. larger by at least a factor two, three, four, five or more. For example, in the shown embodiment, the width Wh is about seven times larger than the height (not indicated here). The smaller the height compared to the width of the channels at the position of overlap, the more membrane surface may be covered by the flow for interaction with its components, while not needing to increase total flow rate.

Figure 2A:
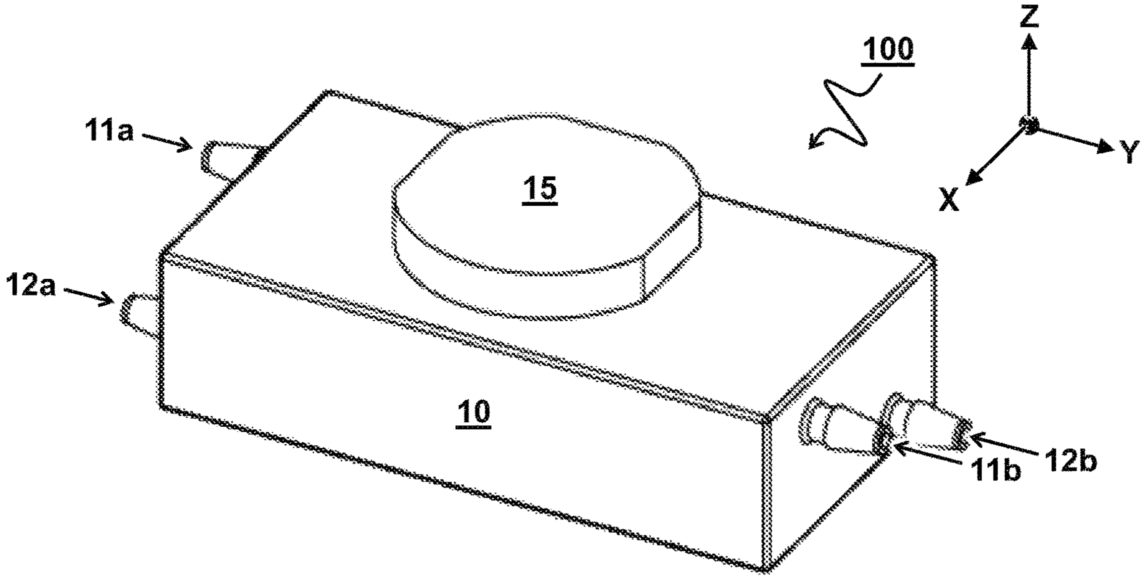
FIGS. 2A-2C illustrate various schematic views of the microfluidic device.
Figure 2B:
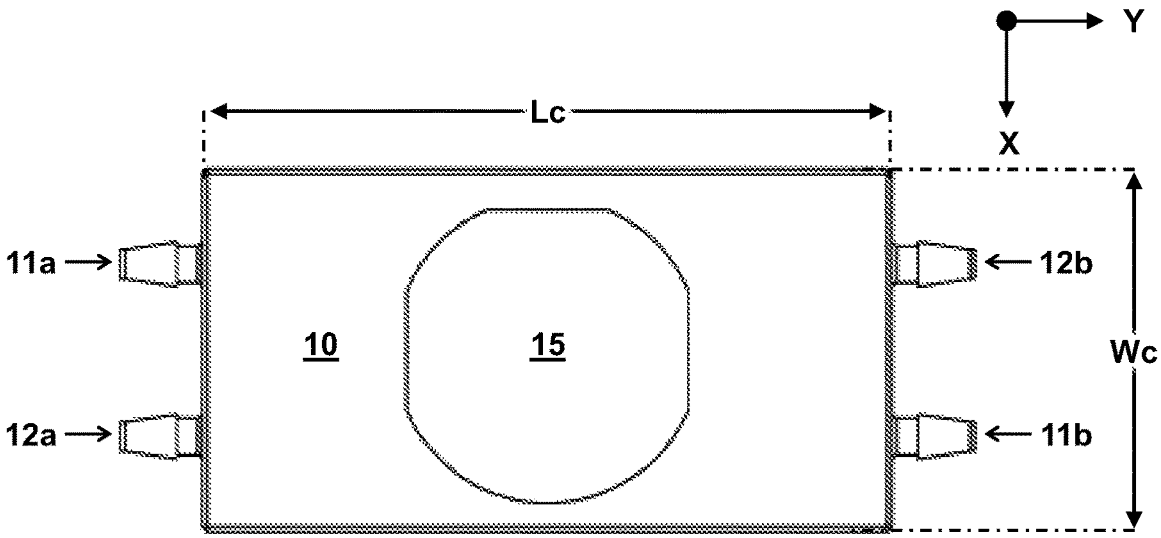
Figure 2C:
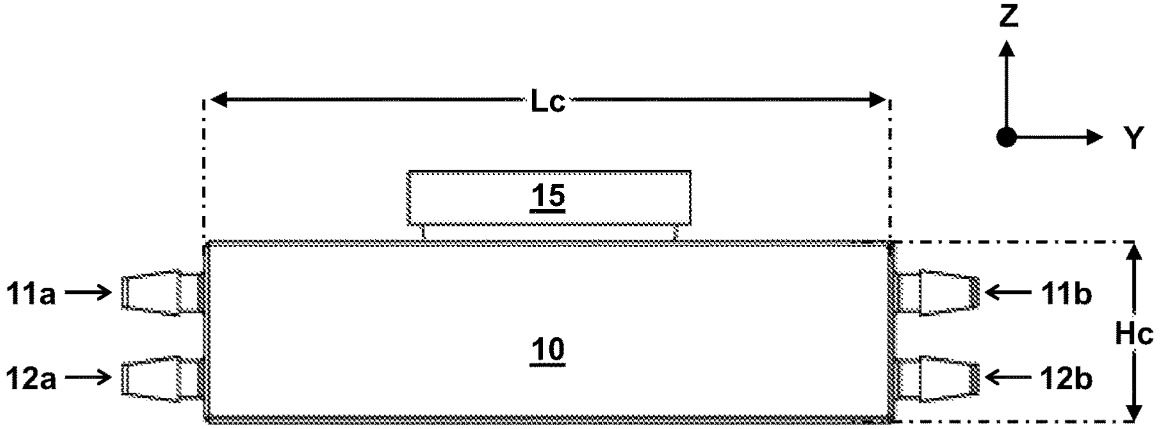

FIGS. 2A-2C illustrate various schematic views of the microfluidic device 100. Preferably, the microfluidic device 100 is relatively small, e.g. with a typical length Lc, width We, and/or height He of the housing 10 between half a centimeter and ten centimeters, preferably less than five or six centimeters. For example, in the present embodiment, the housing has a length Lc of about four centimeters, a width We of about two centimeters, and a height He of about one centimeter. Of course also other sizes can be envisaged. The flow channels can be even smaller, e.g. with a typical minimum diameter less than one millimeter.

Figure 3A:
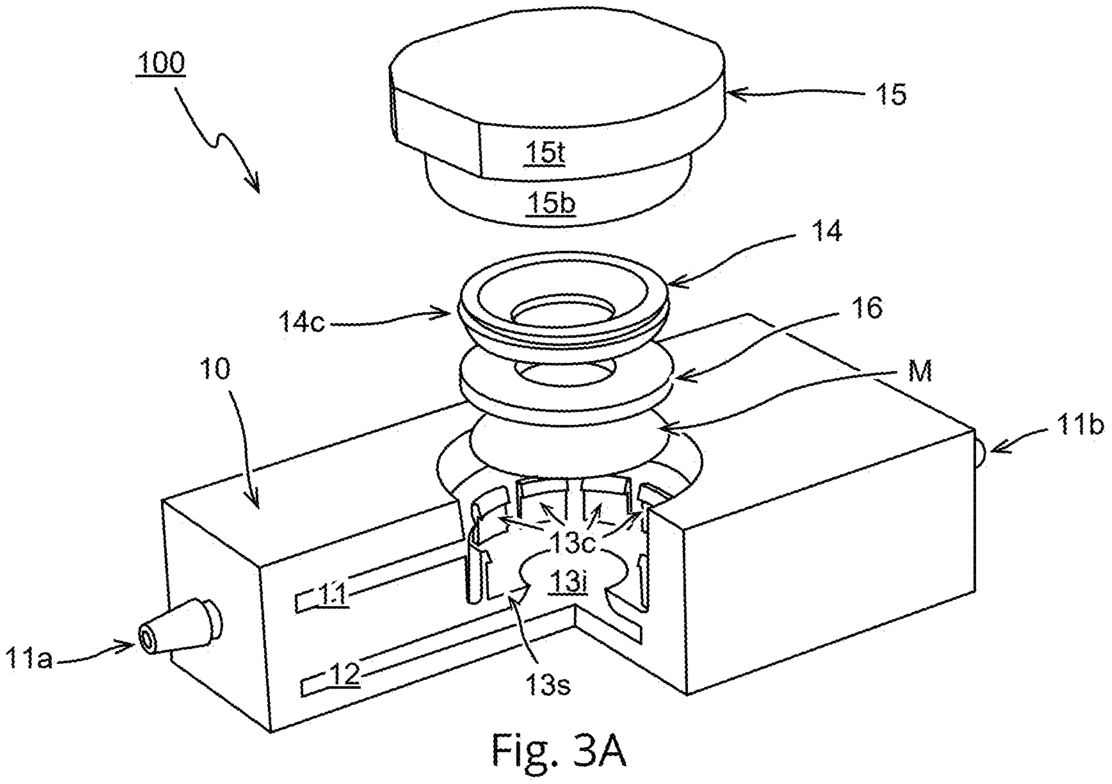
FIG. 3A illustrates a cutout/exploded view of the microfluidic device with its various components.
Figure 3B:
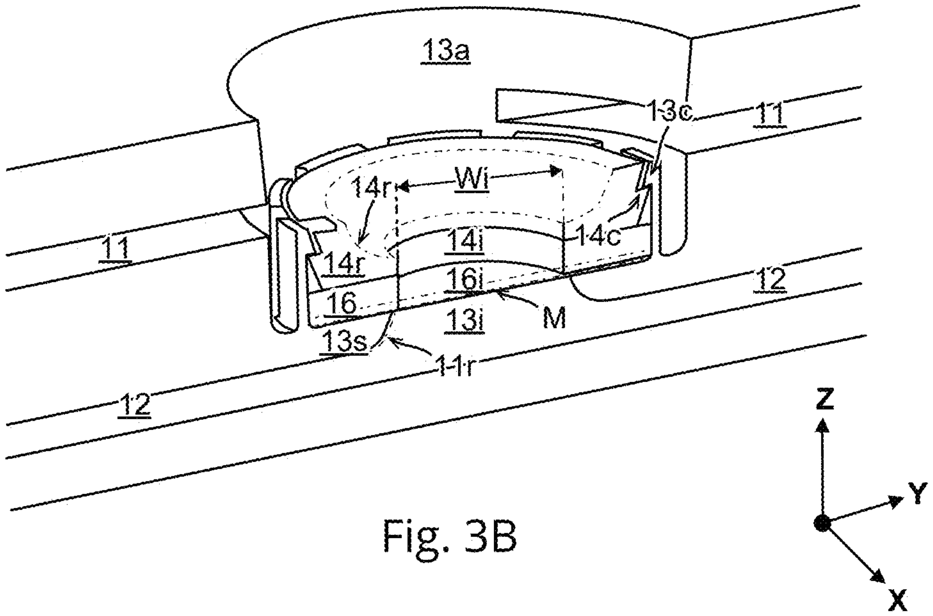
FIG. 3B illustrates another cutout view zoomed in around the cavity opening between the flow channels.

FIG. 3A illustrates a cutout/exploded view of the microfluidic device 100 with its various components. FIG. 3B illustrates another cutout view zoomed in around the cavity opening 13*i* between the flow channels 11,12. In a preferred embodiment, as described herein, the microfluidic device 100 comprises a clamping ring 14. In one embodiment, e.g. as shown, the clamping ring 14 comprises a connection structure 14*c*. For example, the connection structure 14*c* is configured to engage a corresponding connection structure 13*c* of the housing inside the access cavity 13. Accordingly, the clamping ring 14 can be used for holding the sample membrane M in place over the cavity opening 13*i*. Typically, the membrane M is, in use, exposed to the respective fluid flows F1,F2 through the flow channels 11,12 on either sides of the membrane M.

In one embodiment, the housing 10 extends with a cavity seat 13*s* forming a platform around the cavity opening 13*i* between the overlapping areas of the flow channels 11,12 to directly or indirectly hold the membrane M between the cavity seat 13*s* and the clamping ring 14. For example, the membrane M can be placed directly on the cavity seat 13*s*. For example, the clamping ring 14 may directly clamp down on the membrane M. Preferably though a sealing ring 16 is disposed on either one or both sides of the membrane M. In one embodiment, e.g. as shown, at least one sealing ring 16 is, in use, disposed between the membrane M and the clamping ring 14. This may improve sealing and/or prevent the clamping ring to damage (e.g. cut into) the membrane M. Also other or further structures can be disposed between the clamping ring 14 and the membrane M and/or between the membrane M and the cavity seat 13*s*. For example, a mesh can be provided to help further support the membrane M. In one embodiment, the cavity opening 13*i* on one side of the membrane M and a ring opening 14*i* through the clamping ring 14 on another side of the membrane M are configured to, in use, expose the membrane M to the respective fluid flows F1,F2 in the flow channels 11,12.

In a preferred embodiment, the clamping ring 14 is configured to form part of the first flow channel 11. For example, the clamping ring 14 is configured to guide the first fluid flow over the clamping ring 14 between a bottom 15*b* of the cap 15 (sealing the access cavity 13) and the clamping ring 14 to the ring opening 14*i*. In some embodiments, the structures surrounding the openings are relatively thin near the opening, preferably comprising a gradual transition from the flow channels 11,12. In one embodiment, the clamping ring 14 has an inner thickness at its opening 14*i* along its inner diameter, and outer thickness second thickness at its outer diameter, wherein the outer thickness is more than the inner thickness, e.g. by at least a factor two. Preferably, the clamping ring 14 comprises a sloped and/or rounded transition 14*r* between its inner and outer diameters getting gradually thinner towards its center. Accordingly, the flow in the first flow channel 11 can be steered to gradually approach the membrane M on the top In other or further embodiments, the cavity seat 13*s* has an inner thickness at its opening 13*i* along its inner diameter, and outer thickness further from the opening, wherein the outer thickness is more than the inner thickness, e.g. by at least a factor two. Preferably, the cavity seat 13*s* comprises a sloped and/or rounded transition 11*r* getting gradually thinner towards the cavity opening 13*i*. Accordingly, the flow in the second flow channel 12 can alternatively, or additionally, be steered to gradually approach the membrane M on the bottom In one embodiment, the connection structure 13*c* of the housing inside the access cavity 13 surrounds the cavity seat 13*s*. In another or further embodiment, the connection structure 13*c* of the housing inside the access cavity 13 comprises a set of clamping fingers with hooks configured to clamp around a rim of the clamping ring 14. In some embodiments, each of the fingers is configured to pivot radially outward, to allow insertion of the clamping ring, and then return inward with the hooks engaging a corresponding structure, e.g. rim, around the clamping ring 14. For example, at least two, preferably three, four, or more clamping fingers are located circumferentially around the cavity opening 13*i*. In some embodiments, discussed later with reference to FIG. 4B, the connection structure, e.g. fingers, may be omitted at least in a path of the first flow channel 11 to allow a connecting channel 14*a* through the clamping ring 14. For example, the fingers can be disposed only at the sides, or the clamping ring 14 may be held by other means.

In one embodiment, the connection structure 13*c* of the housing, e.g. clamping fingers, protrude from the cavity seat 13*s*. In another or further embodiment, a sealing ring 16 is disposed together with the membrane M between the cavity seat 13*s* and the clamping ring 14. While the clamping ring may comprise a relatively hard material, the sealing ring 16 preferably comprises a (more) resilient material such as rubber. In some embodiments, the sealing ring 16 when held by the clamping ring 14 is configured to prevent a passage of fluid around the sealing ring 16 ring. In other or further embodiments, the sealing ring 16 is configured to exclusively pass fluid through an opening 16*i* in the sealing ring 16 (which opening is, in use, covered by the membrane M, so substances in the fluid may permeate there through).

Preferably, the ring opening 14*i* through the clamping ring 14 and the cavity opening 13*i* between the flow channels 11,12 have a substantially matching interconnection diameter Wi, e.g. deviating less than thirty percent, preferably less than twenty, or less than ten percent. Similar for the opening 16*i* through the sealing ring 16 which is preferably disposed there between. While in a preferred embodiment, the openings are circular, also other shapes can be envisaged. Typically, the sealing ring 16 is configured to (in use) abut the membrane M. In some embodiments, e.g. as shown in FIGS. 1-3, the membrane M is disposed between the sealing ring 16 and the cavity seat 13*s*. Also other or further configurations can be envisaged, e.g. as discussed in the following.

Figure 4A:
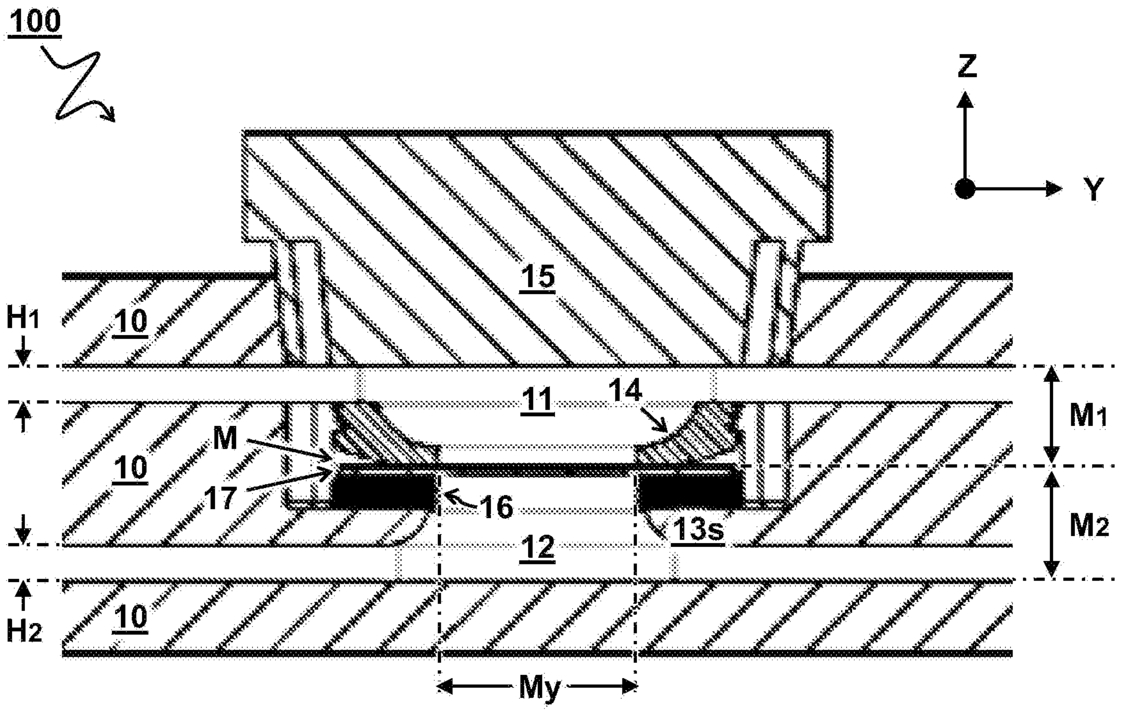
FIG. 4A illustrates a microfluidic device wherein the membrane is disposed between the sealing ring and the clamping ring.

FIG. 4A illustrates a microfluidic device 100 wherein the membrane M is disposed between the sealing ring 16 and the clamping ring 14. This configuration may have an advantage of lifting the membrane M closer to the first fluid flow F1. For example, the thickness of the sealing ring 16 may be similar to a thickness of the clamping ring 14 so the membrane M can be disposed more centrally between the respective flow channels 11,12.

In one embodiment, a first channel height M1 between a position of the membrane M clamped inside the device and opposing wall of the first flow channel 11 is similar to a second channel height M2, opposite the membrane M between the position of the membrane M and opposing wall of the second flow channel 12 within a factor two, preferably within a factor one-and-half. The more similar the respective heights of the channels on either sides of the membranes, the more similar the respective maximum flow distance and corresponding efficiency of parts of the flow interacting with the membrane.

Also other or further components can be disposed between the membrane M and the cavity seat 13*s* and/or between the sealing ring 16 and the cavity seat 13*s*. In a preferred embodiment, a mesh 17 is provided which abuts the membrane M to improve is structural integrity. For example, the mesh 17 can provide a relatively open structure which does not substantially affect permeability of the membrane M. Preferably, the mesh is provided at least below the membrane M. Alternatively, or additionally, a mesh can be provided above the membrane M.

Figure 4B:
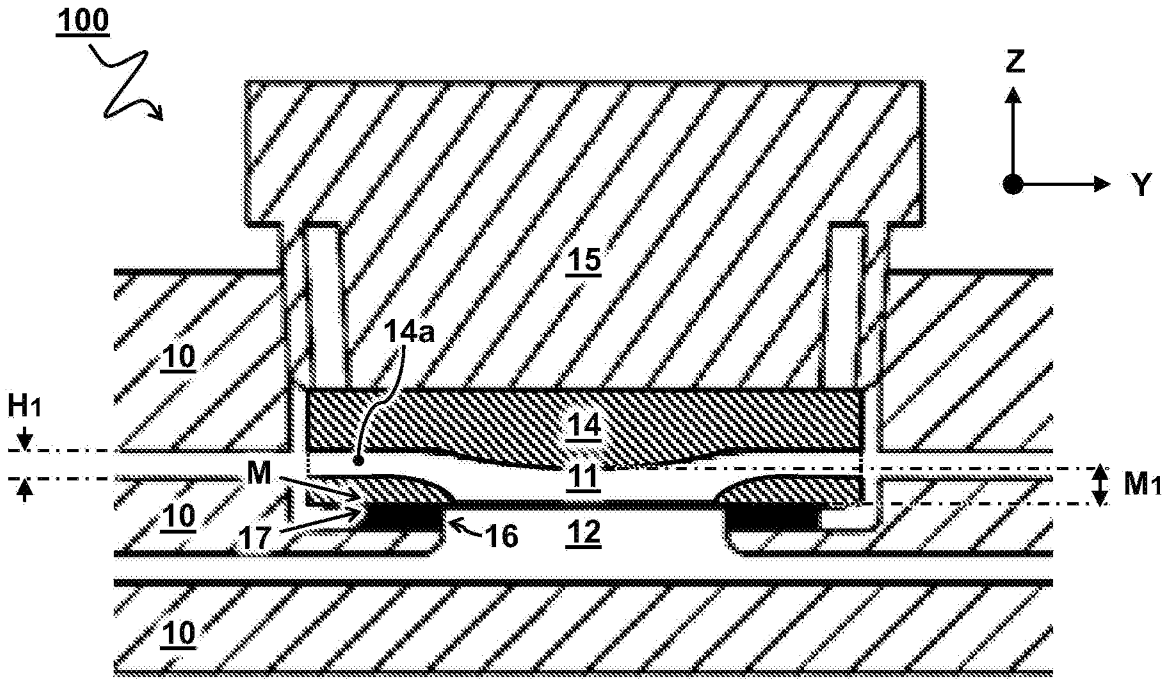
FIG. 4B illustrates a microfluidic device wherein the clamping ring comprises a channel

FIG. 4B illustrates a microfluidic device 100 wherein the clamping ring 14 comprises a channel 14*a*. In a preferred embodiment, e.g. as shown, the clamping ring 14 has a channel 14*a* there through forming part of the first flow channel 11. For example, the clamping ring 14 is configured to form part of the first flow channel 11 for guiding the first fluid flow F1 via a channel 14*a* through the clamping ring 14 to the ring opening which exposes the membrane M, Advantageously, the clamping ring 14 can thus be thicker without obstructing the first flow channel 11 and without increasing the flow distance M1. Furthermore, the clamping ring 14 can optionally be pushed and/or held in place by the cap 15. Optionally, the connection structure 13*c* of the housing inside the access cavity 13 can be omitted.

In some embodiments, the flow distance M1 to the membrane can be further decreased, e.g. by a shape of the channel 14*a* protruding towards the membrane. In one embodiment, a respective channel height M1,M2 between a position of the membrane M clamped inside the device and opposing wall of the respective first and/or second flow channel 11,12 is less than one millimeter, preferably less than 0.8 mm, less then 0.6 mm, or even less than half a millimeter. The smaller the channel height M1,M2 at the position of the membrane, the closer the flow distance and the more effective the flow may interact with the membrane.

In other or further embodiments, a respective channel height M1,M2 of a respective flow channel 11,12 at the position of the membrane M is similar to a channel height H1,H2 of the respective flow channel 11,12 before and/or after the clamping ring 14, e.g. within a factor two, preferably within a factor one-and-half or less. Keeping the channel height relatively constant may promote a more predictable flow.

Figure 5A:
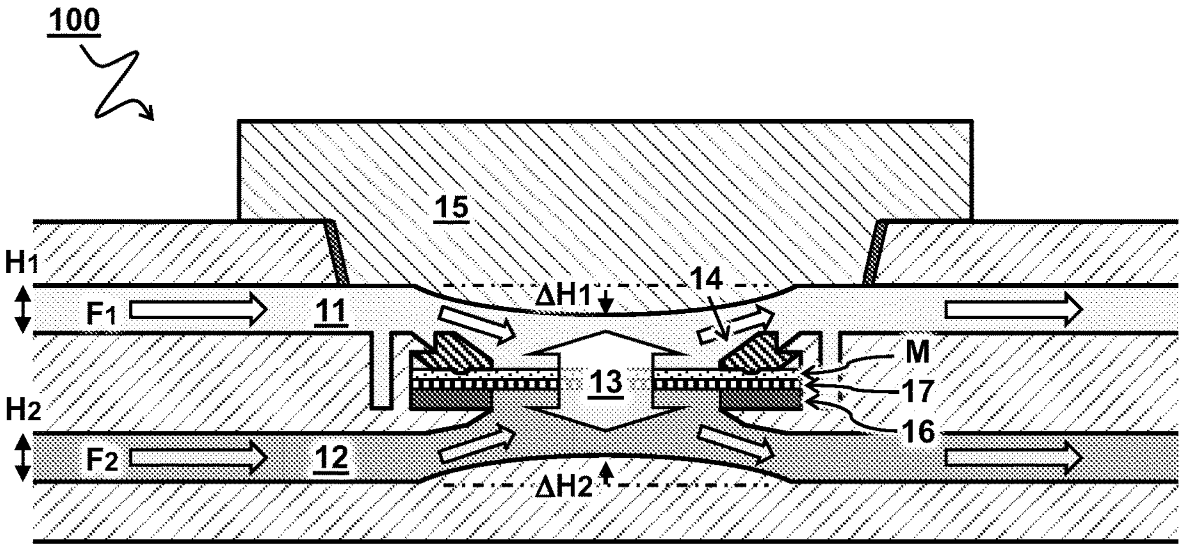
FIG. 5A illustrates a microfluidic device wherein both flow channels are configured to decrease the channel height at the location of the membrane.

FIG. 5A illustrates a microfluidic device 100 wherein both flow channels 11,12 are configured to decrease the channel height at the location of the membrane M. In one embodiment, the first flow channel 11 and/or second flow channel 12 is provided with a respective protrusion ΔH1,ΔH2 towards the access cavity 13 for decreasing a respective channel height H1,H2 at a position of the access cavity 13 and steering a respective flow towards the membrane M. In another or further embodiment, the protrusion can be formed as part of the housing (e.g. as shown here ΔH2 in the second flow channel 12). In another or further embodiment, the protrusion can be formed in the cap 15 (e.g. as shown here ΔH1 in the first flow channel 11). In another or further embodiment, the protrusion can be formed in the clamping ring 14 (e.g. as shown in FIG. 4B). For example, a distance between a top of the first flow channel 11 and membrane without the protrusion can be typically between 2-2.5 mm. By adding the protrusion or bulge, this may guide the flow closer to the membrane, e.g. less than one millimeter, or even less than 0.8 mm, e.g. similar or the same as the channel height (H1) before and/or after the membrane.

Figure 5B:
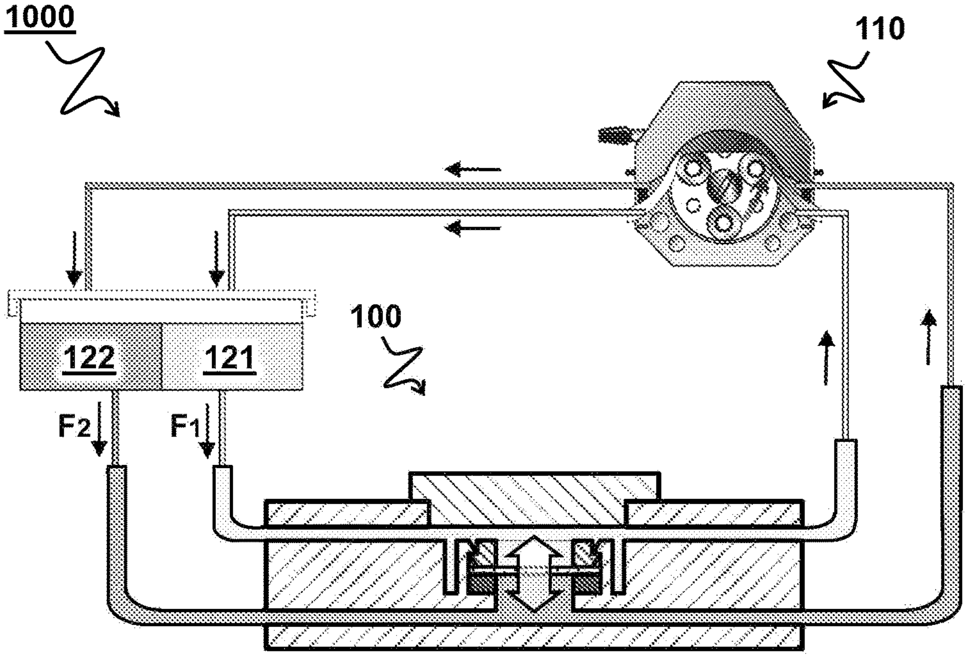
FIG. 5B illustrates a system (not to scale) and method for using a microfluidic device as described herein.

FIG. 5B illustrates a system 1000 (not to scale) and method for using a microfluidic device 100 as described herein.

Aspects of the present disclosure can be embodied as a system comprising the microfluidic device 100 as described herein. In one embodiment, the system comprises a pump 110, preferably peristaltic. In another or further embodiment, the system comprises at least a first and second reservoir 121,122. Channels or tubes can be used to interconnect the microfluidic device 100, pump 110, and reservoirs 121,122 (e.g. with reference to FIG. 1A, via either the first set of connectors 11*a*,11*b*; or the second set of connectors 12*a*,12*b*). Preferably, a first flow F1 through the first reservoir 121 is separate from a second flow F2 through the second reservoir 122 (except through the membrane M held inside the microfluidic device 100).

The microfluidic device 100 or system 1000 as described herein can be used e.g. for analyzing permeability of substances through a membrane M. In use, the membrane M is placed in the cavity opening 13*i* between the first flow channel 11 and the second flow channel 12. In some embodiments, a first flow F1 is passed via the first reservoir 121 through the first flow channel 11, and a second flow F2 is passed via the second reservoir 122 through the second flow channel 12. For example, the substances can be disposed in at least one of the fluid flows F1,F2, e.g. in different amounts. In some embodiments, a respective content of the substances in the first and/or second reservoir 121 is measured and/or monitored to determine an exchange of the substances through the membrane M.

Typical flows may e.g. be set between one and hundred milliliter per hour e.g. depending on channel height. For example, components can be added to the first reservoir 121 and measured in the second reservoir 122, e.g. by taking a sample from the reservoir. For example, the first reservoir 121 can be used to act as (emulate) a lumen while the second reservoir 122 can be used to act as a blood vessel. For example, the components may include nutritional components, medicine, et cetera. For example, the membrane M comprises a tissue sample, scaffold e.g. 3D structure with cells, or other membrane, e.g. plastic or polyester. Accordingly the microfluidic device 100 can or system 1000 be used to test various membranes.

In interpreting the appended claims, it should be understood that the word “comprising” does not exclude the presence of other elements or acts than those listed in a given claim; the word “a” or “an” preceding an element does not exclude the presence of a plurality of such elements; any reference signs in the claims do not limit their scope; several “means” may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A microfluidic device for analyzing permeability of substances through a membrane, wherein the substances are disposed in a first fluid flow and second fluid flow, the microfluidic device comprising:

a housing;

a first flow channel for passing the first fluid flow, through the housing, between a first input connector and a first output connector;

a second flow channel for passing the second fluid flow, through the housing, between a second input connector and a second output connector;

an access cavity extending, from outside the housing, into the housing through the first flow channel and into the second flow channel for accessing an inside of the housing to place the membrane over a cavity opening forming an exclusive fluid interconnection between overlapping areas of the first flow channel and the second flow channel; and a clamping ring comprising a connection structure configured to engage a connection structure of the housing inside the access cavity for holding the membrane in place over the cavity opening while the membrane is, in use, exposed to the first fluid flow and the second fluid flow through the first flow channel and the second flow channel, respectively, on either side of the membrane, wherein the cavity opening on one side of the membrane and a ring opening through the clamping ring on another side of the membrane are configured to expose the membrane to the first fluid flow and the second fluid flow in the first flow channel and the second flow channel, respectively, and wherein the clamping ring is configured to form a portion of the first flow channel, such that the portion of the first flow channel is configured to be exposed to the first fluid flow.

2. The microfluidic device according to claim 1, wherein the clamping ring comprises a sloped and/or rounded transition between inner and outer diameters of the clamping ring, and wherein the clamping ring thickness becomes gradually thinner towards a center of the clamping ring where the membrane is to be exposed to the first fluid flow.

3. The microfluidic device according to claim 1, wherein an integral part of the housing extends with a cavity seat forming a platform around the cavity opening between overlapping areas of the first flow channel and the second flow channel to directly or indirectly hold the membrane between the cavity seat and the clamping ring, wherein the connection structure of the housing inside the access cavity surrounds the cavity seat, and wherein the connection structure of the housing protrudes from the cavity seat.

4. The microfluidic device according to claim 3, wherein the cavity seat comprises a sloped and/or rounded transition getting gradually thinner towards the cavity opening where the membrane is to be exposed to the second fluid flow.

5. The microfluidic device according to claim 4, wherein a sealing ring of resilient material is disposed together with the membrane between the cavity seat and the clamping ring, and wherein the sealing ring is configured to abut the membrane.

6. The microfluidic device according to claim 1, wherein the clamping ring is configured to:

guide the first fluid flow via a channel through the clamping ring to the ring opening, and/or guide the first fluid flow over the clamping ring, between a bottom of a cap sealing the access cavity and the clamping ring, to the ring opening.

7. The microfluidic device according to claim 1, wherein the connection structure of the housing inside the access cavity comprises a set of clamping fingers with hooks configured to clamp around a rim of the clamping ring, wherein each one of the set of clamping fingers is configured to pivot radially outward, to allow insertion of the clamping ring, and then return inward with the hooks engaging a corresponding structure, around the clamping ring, and wherein the set of clamping fingers are located circumferentially around the cavity opening.

8. The microfluidic device according to claim 1, wherein a mesh is provided between the membrane and the cavity opening.

9. The microfluidic device according to claim 1, wherein the first flow channel and the second flow channel each have a channel width directly before and/or after the cavity opening, which channel width is larger than a cross-section diameter of the cavity opening between the first flow channel and the second flow channel by at least a factor 1.1.

10. The microfluidic device according to claim 1, wherein the first flow channel and the second flow channel start with a first channel width at a side of the input and/or output connectors, and gradually widen to a second channel width towards the cavity opening, and wherein the second channel width is larger than the first channel width by at least a factor two.

11. The microfluidic device according to claim 1, wherein a width of the first flow channel and the second flow channel, at least directly before the cavity opening is larger than a respective height of the flow channels by at least a factor two.

12. The microfluidic device according to claim 1, wherein a first channel height between a position of the membrane clamped inside the device and opposing wall of the first flow channel is similar to a second channel height, opposite the membrane between the position of the membrane and opposing wall of the second flow channel within a factor two.

13. The microfluidic device according to claim 1, wherein the first flow channel and/or second flow channel is provided with a respective protrusion towards the access cavity for decreasing a respective channel height at a position of the access cavity and steering a respective flow of the first flow channel and the second flow channel towards the membrane.

14. A system comprising:

a microfluidic device comprising:

a housing;

a first flow channel for passing a first fluid flow, through the housing, between a first input connector and a first output connector;

a second flow channel for passing a second fluid flow, through the housing, between a second input connector and a second output connector;

an access cavity extending, from outside the housing, into the housing through the first flow channel and into the second flow channel for accessing an inside of the housing to place a membrane over a cavity opening forming an exclusive fluid interconnection between overlapping areas of the first flow channel and second flow channel; and a clamping ring comprising a connection structure configured to engage a corresponding connection structure of the housing inside the access cavity for holding the membrane in place over the cavity opening while the membrane is, in use, exposed to the first fluid flow and the second fluid flow through the first flow channel and the second flow channel, respectively, on either side of the membrane, wherein the cavity opening on one side of the membrane and a ring opening through the clamping ring on another side of the membrane are configured to expose the membrane to the first fluid flow and the second fluid flow in the first flow channel and the second flow channel, respectively, and wherein the clamping ring is configured to form a portion of the first flow channel, such that the portion of the first flow channel is configured to be exposed to the first fluid flow;

a pump;

a first reservoir and a second reservoir; and channels interconnecting the microfluidic device, pump, and reservoirs;

wherein the first flow through the first reservoir is separate from the second flow through the second reservoir except through the membrane held inside the microfluidic device.

15. A method for analyzing permeability of substances through a membrane, the method comprising:

providing a microfluidic device comprising:

a housing;

a first flow channel for passing a first fluid flow, through the housing, between a first input connector and a first output connector;

a second flow channel for passing a second fluid flow, through the housing, between a second input connector and a second output connector;

an access cavity extending, from outside the housing, into the housing through the first flow channel and into the second flow channel for accessing an inside of the housing to place a membrane over a cavity opening forming an exclusive fluid interconnection between overlapping areas of the first flow channel and second flow channel; and a clamping ring comprising a connection structure configured to engage a corresponding connection structure of the housing inside the access cavity for holding the membrane in place over the cavity opening while the membrane is, in use, exposed to the first fluid flow and the second fluid flow through the first flow channel and the second flow channel, respectively, on either side of the membrane, wherein the cavity opening on one side of the membrane and a ring opening through the clamping ring on another side of the membrane are configured to expose the membrane to the first fluid flow and the second fluid flow in the first flow channel and the second flow channel, respectively, and wherein the clamping ring is configured to form a portion of the first flow channel, such that the portion of the first flow channel is configured to be exposed to the first fluid flow;

placing the membrane in the cavity opening between the first flow channel and the second flow channel;

passing the first flow with the substances via a first reservoir through the first flow channel;

passing the second flow via a second reservoir through the second flow channel; and monitoring a respective content of the substances in the first reservoir and/or the second reservoir to determine an exchange of the substances through the membrane.

16. The method according to claim 15, wherein the first flow through the first reservoir is separate from the second flow through the second reservoir except through the membrane held inside the microfluidic device.

* * * * *